US011122046B2

(12) United States Patent
Bastide et al.

(10) Patent No.: US 11,122,046 B2
(45) Date of Patent: *Sep. 14, 2021

(54) TECHNOLOGY FOR GENERATING A MULTI-USER RESPONSE IN A NETWORK

(71) Applicant: International Business Machines Corporation, Armonk, NY (US)

(72) Inventors: Paul R. Bastide, Boxford, MA (US); Matthew E. Broomhall, Goffstown, NH (US); Thomas J. Evans, Cary, NC (US); Robert E. Loredo, North Miami Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 82 days.

This patent is subject to a terminal disclaimer.

(21) Appl. No.: 16/550,256

(22) Filed: Aug. 25, 2019

(65) Prior Publication Data

US 2019/0386999 A1 Dec. 19, 2019

Related U.S. Application Data

(63) Continuation of application No. 16/549,976, filed on Aug. 23, 2019, which is a continuation of application
(Continued)

(51) Int. Cl.
*H04L 29/06* (2006.01)
*H04L 12/58* (2006.01)
*H04W 4/21* (2018.01)

(52) U.S. Cl.
CPC ............ *H04L 63/101* (2013.01); *H04L 51/02* (2013.01); *H04L 51/12* (2013.01); *H04L 63/104* (2013.01); *H04W 4/21* (2018.02); *H04L 51/32* (2013.01)

(58) Field of Classification Search
CPC ....... H04L 63/101; H04L 51/02; H04L 51/12; H04L 63/104; H04L 51/32; H04W 4/21
See application file for complete search history.

(56) References Cited

U.S. PATENT DOCUMENTS 7,448,069 B2  11/2008  Takamatsuya
8,423,392 B2   4/2013  Moxley et al.
(Continued)

OTHER PUBLICATIONS

Paul R. Bastide, et al. "Technology for Generating a Multi-User Response in a Network ," U.S. Appl. No. 15/451,302, filed Mar. 6, 2017. A Copy Is Not Provided Herein, Since This Application Is Internally Available to the Examiner.
(Continued)

*Primary Examiner* — Abu S Sholeman
(74) *Attorney, Agent, or Firm* — Anthony V.S. England; L. Jeffrey Kelly; Susan M. Maze

(57) ABSTRACT

A system for user-processing of data includes a processor, computer readable storage medium, and a program for generating an authorized response to a message in a network. Messages with content that relates to a group, sent by an originator via a network, are detected. The computer system determines that the message relates to the group by analyzing the message content. Members of the group are selected as designated senders to contribute to an authorized response for the group by analyzing the message. Selected designated senders are notified that they are selected to contribute to the authorized response. Initial responses to the originator from the designated senders are intercepted. The computer system combines the initial responses from the designated senders for generating a combined response as an authorized response for the group and sends the combined response to the originator via the network as the authorized response for the group.

14 Claims, 3 Drawing Sheets

Related U.S. Application Data

No. 15/880,358, filed on Jan. 25, 2018, now Pat. No. 10,447,698, which is a continuation of application No. 15/451,302, filed on Mar. 6, 2017, now Pat. No. 10,454,937.

(56) References Cited

U.S. PATENT DOCUMENTS

| | | | |
|---|---|---|---|
| 8,972,894 | B2 | 3/2015 | Ross |
| 9,002,379 | B1 | 4/2015 | Yang |
| 9,465,645 | B1 | 10/2016 | Roth |
| 9,690,441 | B2 | 6/2017 | Kim |
| 10,089,585 | B1* | 10/2018 | Alexander ..... G06Q 10/063112 |
| 10,530,721 | B2* | 1/2020 | Lampkin ................. H04L 51/32 |
| 2003/0061508 | A1* | 3/2003 | Bhat ....................... H04L 51/28 726/4 |
| 2003/0158860 | A1 | 8/2003 | Caughey |
| 2005/0010799 | A1* | 1/2005 | Kelley ................... G06Q 10/10 726/22 |
| 2008/0037583 | A1 | 2/2008 | Dawes |
| 2009/0096621 | A1* | 4/2009 | Ferlitsch ............. G03G 15/502 340/635 |
| 2013/0046664 | A1* | 2/2013 | Kazerani ................ H04L 67/10 705/34 |
| 2013/0304827 | A1* | 11/2013 | Bastide ................... H04L 51/32 709/206 |
| 2014/0040404 | A1 | 2/2014 | Pujare |
| 2014/0214831 | A1 | 7/2014 | Chi et al. |
| 2014/0214992 | A1 | 7/2014 | Payne et al. |
| 2015/0373670 | A1 | 12/2015 | Fang |
| 2016/0036754 | A1* | 2/2016 | Mese ...................... H04L 51/00 709/206 |
| 2016/0294833 | A1 | 10/2016 | Wu |
| 2018/0131660 | A1 | 5/2018 | Lambert |
| 2018/0255064 | A1 | 9/2018 | Bastide |
| 2018/0255065 | A1 | 9/2018 | Bastide |
| 2019/0379670 | A1 | 12/2019 | Bastide |

OTHER PUBLICATIONS

Paul R. Bastide, et al. "Technology for Generating a Multi-User Response in a Network ," U.S. Appl. No. 15/880,358, filed Jan. 25, 2018. A Copy Is Not Provided Herein, Since This Application Is Internally Available to the Examiner.

Paul R. Bastide, et al. "Technology for Generating a Multi-User Response in a Network ," U.S. Appl. No. 16/549,976, filed Aug. 23, 2019. A Copy Is Not Provided Herein, Since This Application Is Internally Available to the Examiner.

* cited by examiner

TECHNOLOGY FOR GENERATING A MULTI-USER RESPONSE IN A NETWORK

BACKGROUND

Online social networks such as Twitter and Facebook provide universal mechanisms to connect people and information in logical and organized ways. These networks enable the users to rapidly share and process information by messaging and posting via interfaces including inboxes, walls, activity streams, timelines and profiles, for example. (Herein, unless explicitly indicated otherwise, "or" is intended to include "and." For example, to "message or post" may be to message in one instance, to post in one instance and to message and post in another instance. Further, the term "messaging" may be used to include messaging or posting.)

SUMMARY

A system for user-processing of data includes a processor and a computer readable storage medium connected to the processor having recorded thereon a program for controlling the processor. The processor is operative with the program to execute the program for generating an authorized response to a message in a network. The computer system detects a message sent by an originator via a network. The message includes message content that relates to a group. The computer system determines that the message relates to the group by analyzing the message content and selects members of the group as designated senders to contribute to an authorized response to the message for the group. Designated senders are selected based on analyzing the message. The computer system notifies the designated senders selected by the computer system that the senders are selected by the computer system to contribute to the authorized response and intercepts initial responses to the originator from the designated senders. The computer system combines the initial responses from the designated senders for generating a combined response as an authorized response for the group and sends the combined response to the originator via the network as the authorized response for the group.

Computer program products relating to the above-summarized system are also described and claimed herein.

BRIEF DESCRIPTION OF DRAWINGS

Novel features believed characteristic of the invention are set forth in the appended claims. The invention itself, however, as well as a preferred mode of use, objectives and advantages thereof, will best be understood by reference to the following detailed description of an illustrative embodiment when read in conjunction with the accompanying drawings, wherein:

DETAILED DESCRIPTION

Detailed embodiments of the present invention are disclosed herein to illustrate claimed structures and methods. This invention may, however, be embodied in many different forms and should not be construed as limited to the exemplary embodiments disclosed herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Figure 1:
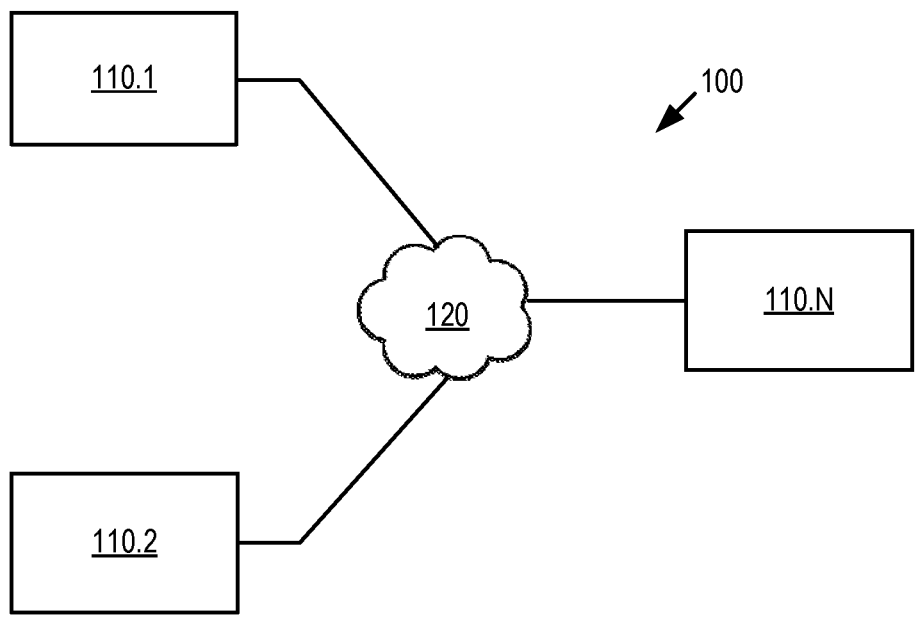
FIG. 1 illustrates a networked computer environment, according to embodiments of the present invention.

FIG. 1 illustrates an example computing and network communication environment 100, according to embodiments of the present invention. As shown, environment 100 includes computer systems 110.1, 110.2 through 110.N and connects via network 120, which may be public or private. Systems 110.1, 110.2, etc. include modules, which may be program or hardware modules, configured to perform tasks for their own respective systems or for other systems or both. In various instances, message communication via network 120 may include communication via protocols for email, instant message, text message or proprietary protocols.

Figure 2:
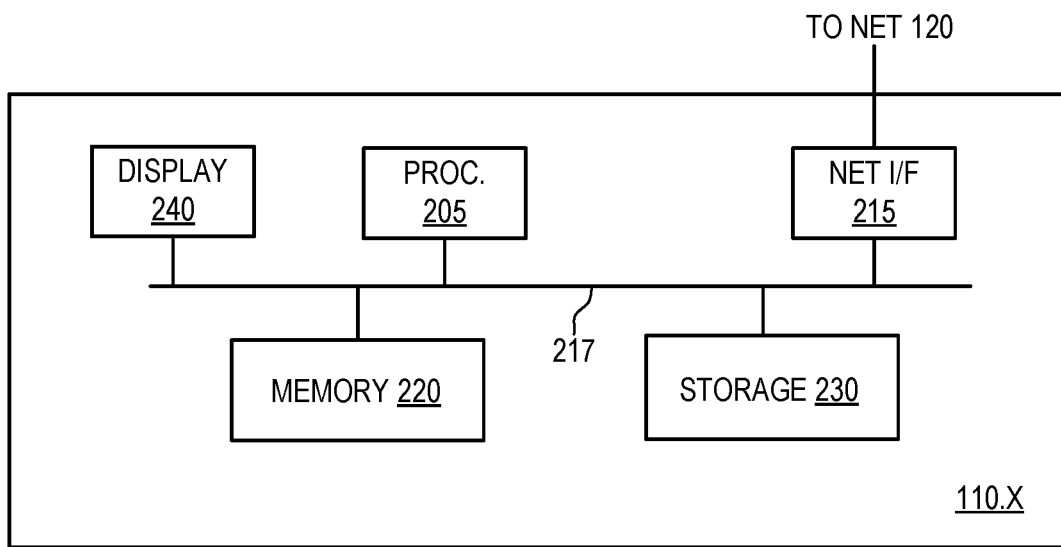
FIG. 2 is a block diagram of a computer system suitable for systems shown in FIG. 1, according to embodiments of the present invention.
Figure 3:
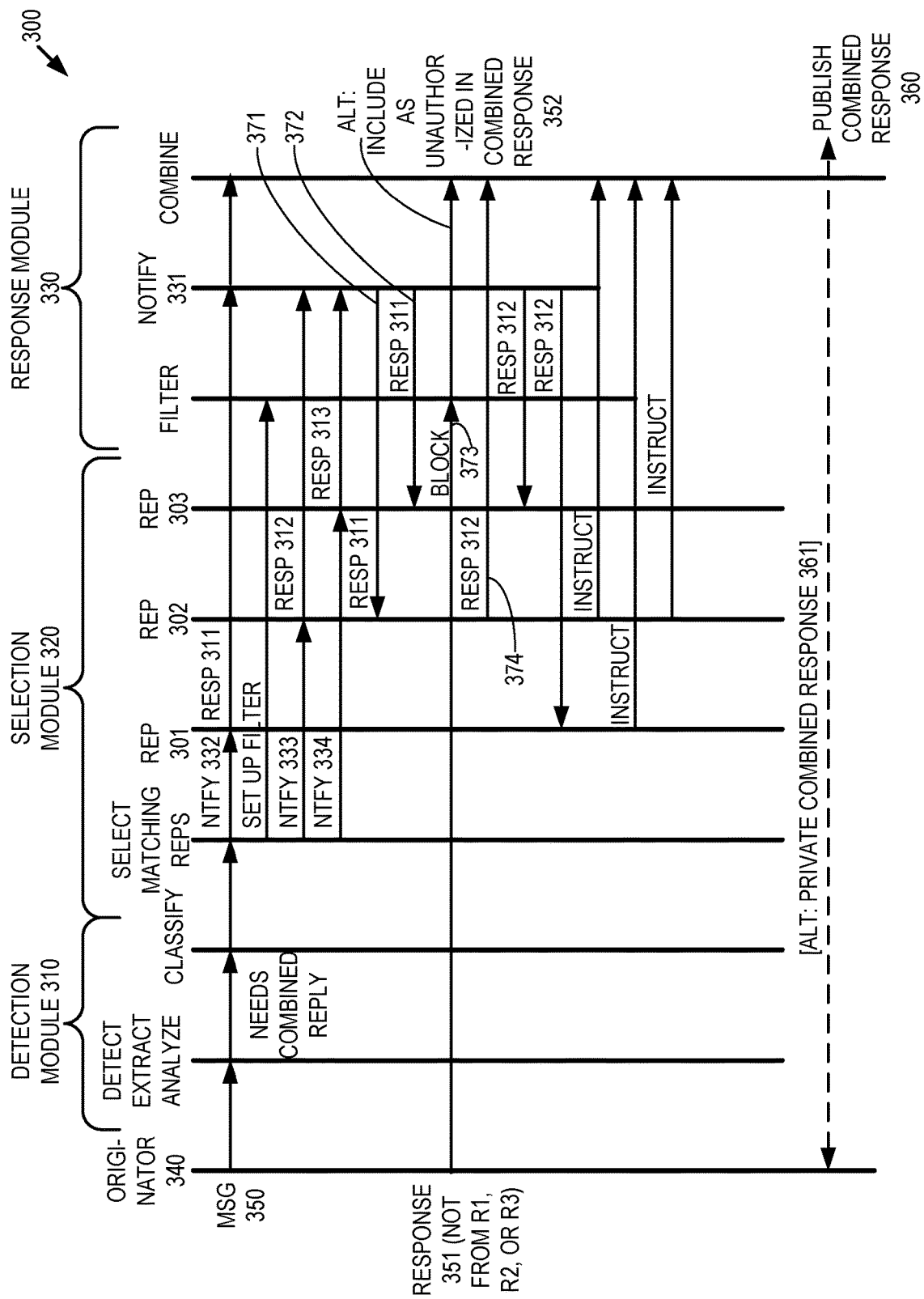
FIG. 3 illustrates a signal diagram for generating a single authorized response by automatic actions of software modules executing on computer systems for predetermined types of messages, according to an embodiment of the present invention.

FIG. 2 illustrates details of a computer system 200 suitable as computer systems 110.1, 110.2, etc. according to embodiments of the present invention, wherein system 200 includes at least one central processing unit (CPU) 205, network interface 215, interconnect (i.e., bus) 217, memory 220, storage device 230 and display 240. CPU 205 may retrieve and execute programming instructions stored in storage device 230 for applications, such as modules 310, 320, and 330 (FIG. 3). Similarly, CPU 205 may retrieve and store application data residing in storage device 230. Interconnect 217 may facilitate transmission, such as of programming instructions and application data, among CPU 205, storage 230, network interface 215, and memory 220. CPU 205 is representative of a single CPU, multiple CPUs, a single CPU having multiple processing cores, and the like. Additionally, memory 220 is representative of a random-access memory, which includes retrieved data and program modules for run-time execution, according to embodiments of the present invention. It should be understood that system 200 may be implemented by other hardware and that one or more modules thereof may be firmware.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

One or more databases may be included in a host for storing and providing access to data for the various implementations. One skilled in the art will also appreciate that, for security reasons, any databases, systems, or components of the present invention may include any combination of databases or components at a single location or at multiple locations, wherein each database or system includes any of various suitable security features, such as firewalls, access codes, encryption, de-encryption and the like.

The database may be any type of database, such as relational, hierarchical, object-oriented, and/or the like. A database product that may be used to implement the databases is IBM® DB2®, or other available database products. (IBM and DB2 are trademarks of International Business Machines Corporation, registered in many jurisdictions worldwide.) The database may be organized in any suitable manner, including as data tables or lookup tables.

Association of certain data may be accomplished through any data association technique known and practiced in the art. For example, the association may be accomplished either manually or automatically. Automatic association techniques may include, for example, a database search, a database merge, GREP, AGREP, SQL, and/or the like. The association step may be accomplished by a database merge function, for example, using a key field in each of the manufacturer and retailer data tables. A key field partitions the database according to the high-level class of objects defined by the key field. For example, a certain class may be designated as a key field in both the first data table and the second data table, and the two data tables may then be merged based on the class data in the key field. In this embodiment, the data corresponding to the key field in each of the merged data tables is preferably the same. However, data tables having similar, though not identical, data in the key fields may also be merged by using AGREP, for example.

The host may provide a suitable website or other internet-based graphical user interface accessible by users. In one embodiment, Netscape web server, IBM® Websphere® Internet tools suite, an IBM DB2, universal database platform and a Sybase database platform are used in conjunction with a Sun Solaris operating system platform. (IBM and WebSphere are trademarks of International Business Machines Corporation, registered in many jurisdictions worldwide.) Additionally, components such as JBDC drivers, IBM connection pooling and IBM MQ series connection methods may be used to provide data access to several sources. The term webpage as it is used herein is not meant to limit the type of documents and applications that might be used to interact with the user. For example, a typical website might include, in addition to standard HTML documents, various forms, Java applets, Javascript, active server pages (ASP), Java Server Pages (JSP), common gateway interface scripts (CGI), extensible markup language (XML), dynamic HTML, cascading style sheets (CSS), helper applications, plug-ins, and the like.

Sometimes the free-form messaging/posting on social networks drives conflicting statements, which may reduce customer confidence. In one scenario, for example, Alice 301, Bob 302, Charlie are members of an online social network and are representatives of a Company X, as indicated by their community membership statuses. Company X produces a software application, which Alice 301, Bob 302 and Charlie care deeply about, of course. A customer, Eve, posts "YZ is hung again. Any help out there?" Alice 301 responds "Thanks Eve, it's working for me." Bob 302 responds "It's not working for me but try logging in again." And Charlie responds, "It's working for me." Consequently, Eve must decide which message to act upon. This is not difficult when there are only a few messages, as in this example, or they are not contradictory. But in other instances, Eve may receive a flood of inconsistent responses, which may reduce Eve's trust of the software application that she messaged about.

Referring now to FIG. 3, a signal diagram for generating a single authorized response by automatic actions of software modules executing on computer systems for predetermined types of messages is depicted, according to an embodiment of the present invention, where the system includes detection module 310, selection module 320, and response module 330, and where the combined actions of the software modules generate the single response based on responses from more than one person, which the software modules automatically prompt and mediate. Detection module 310 detects a social network message 350 from originator 340 (such as from one of the computer systems 110.1, 110.2, etc. in network 120 of FIG. 1), determines whether message 350 needs an authorized response and, if needed, alerts selection module 320. (A message for which an authorized response is needed is referred to herein as a "vital message." The message may or may not be a question.) In turn, selection module 320 selects persons and notifies them that they should contribute to an authorized response to vital message 350. Selection module 320 is also configured to be able to identify bots or other automated or pre-determined responses. Actions by the selected people for contributing to the authorized response are mediated by response module 330.

The technology disclosed herein is configured to operate on messages of an online social network, according to an embodiment of the present invention, such as, for example, Twitter, Facebook, IBM Connections, Jive and Yammer. According to another embodiment of the present invention, the technology disclosed herein is configured to operate on messages of a messaging system, such as, for example, Outlook, Gmail and Lotus Notes.

When a new message, e.g. message 350, is created, or is about to be created by originator 340, an event occurs, which may be one or more of a push event, a pull event and a user interface (UI) event, for example. For a UI event, detection module 310 may detect an event in which message 350 is submitted via the UI. A UI event may also be based on a draft/menu action. Detection module 310 may be in line to the message creation may be activated automatically via a menu action and may be associated with a UI element that is configured for initiating message creation. An example of a push event includes content (a message) published to a subscriber, whereupon the subscriber may act on the message. In this context, detection module 310 may detect the publication event via an application programming interface (API). Gnip API and Compliance API are API's commonly used for this. An example of a pull event includes Hootsuite, Twitter Feeds and IBM Connections OpenSocial Activity Stream, wherein each provides a message list in the form of a feed that is continually updated. In this context, detection module 310 may monitor for an updated entry added to the feed.

Further, detection module 310 may detect that message 350 is a vital message by extracting content from the message and analyzing the content. This may identify topic, for example, such as by grammatical analysis. In one aspect, extracting content may be facilitated by detection module 310 identifying text associated with specific symbols like "?," "@," and "#." For example, detection module 310 may be configured to detect that message 350 is a vital message when the message contains a specific keyword. Detection module 310 may be configured to detect that message 350 is a vital message when the message contains a specific combination of keywords.

Also, message 350 may have an associated status, such as high importance, confidential, or the like. In another type of status, message 350 may be promotional, such as a paid for message. According to at least one embodiment of the present invention, detection module 310 determines that message do or do not need an authorized response, regardless of their content, depending on their status. For example, detection module 310 may be configured to ignore messages unless they have at least one of the following status categories: urgent, important, and NOT promotional. For example, detection module 310 may be configured to ignore messages unless they are promotional.

Detection module 310 may be configured to detect that message 350 is a vital message when the message contains a predetermined keyword or combination of keywords and also has a status that matches a predefined set of status types or does not match a predefined set of status types.

Detection module 310 classifies vital message 350 and passes the classification to selection module 320 in response to detecting that the message is a vital message. Message 350 may include a subject line and tags. Also, message 350 may have an associated sender, originator 340, and may have an associated location of originator 340. Message 350 may also indicate an organization with which originator 340 is associated, such as in a closing in the body of the message or in an address of originator 340 and may likewise indicate a hierarchical position of originator 340 within the organization. Detection module 310 uses these features, e.g., subject, tags, location, organization, etc. to classify the message. Organization information commonly publicly available in profiles of message 350 sender 340 and receiver profiles may be extracted for even more accurate classification. Further, for classifying message 350, detection module 310 may use content extracted from the message that was used to determine if the message is a vital message, as described herein above.

Selection module 320, upon receiving the classification for vital message 350 from detection module 310, selects suitable representatives, e.g., first representative 301, second representative 302, and third representative 303, in this example, who are likely to respond, which selection module 320 does by finding a match between the received classification and candidate representatives.

A predetermined pool of users of the social network is provided to serve as candidate representatives for responses in advance of receiving messages that need authorized responses, according to an embodiment of the present invention, where the pool is identified in an initialization process. According to at least one embodiment of the present invention, the technology disclosed herein is in the context of a social network and the pool includes all users of the social network. In other embodiments, the pool is more limited. For example, the pool may be limited to predetermined experts. The pool may be defined in a database that is maintained manually.

Also, the database may be changed or added to based on previous authorized response transactions. For example, when a representative is initially selected by selection module 320 to respond to message 350, the initially selected representative may manually indicate a different representative who the initial representative feels is better suited to respond. Selection module 320 may be preconfigured to replace the initially selected representative with the representative identified by the initially selected representative. Selection module 320 may, alternatively, be preconfigured to add the representative identified by the initially selected representative. Still further, the initially selected representative may indicate whether to replace themselves in the pool or add the other representative and selection module 320 may be configured to take action accordingly.

In another example of how the database may be changed or added to based on previous authorized response transactions, according to an embodiment of the present invention, persons in the pool may be rated (e.g., ranking) according to how their initial responses were received by other selected representatives in prior authorized responses, where the ranking may be indicated by the voting of the selected representatives described herein below. Selection module 320 may be configured to select representatives based on their ratings.

Selection module 320 makes the matches with representatives from the predetermined pool of candidate users, where a candidate selected as a representative, i.e., a matching candidate, has relevant awareness, knowledge or expertise, such as indicated in candidate's social network, which may be in the profile or timeline, for example, or as indicated in the social network, intranet or website of an organization with which the candidate is associated. More specifically, the selected candidate's relevant awareness, knowledge or expertise may be indicated by a match between the classification and one or more of the following, for example:

i) explicit statements about candidate's awareness, knowledge or expertise,
ii) candidate's association with relevant organization, person, etc.,
iii) candidate's position within an organization, where the organization or position are related to the classification, such as where the position indicates the candidate is responsible for a product or service indicated in the classification,
iv) candidate's degree, registration or other certification in a field related to the classification or for a product or service indicated in the classification,
v) candidate has engaged in activity indicating relevant awareness, knowledge or expertise, such as may be found in the candidate's social network activity stream and timeline, and
vi) recommendations of the candidate from other social network users, such as may be found in the candidate's inbox, wall, activity stream, timeline and profile and such as may be found in the inbox, wall, activity stream, timeline and profile of another other user.

(These criteria are not exhaustive. Also, they are not necessarily mutual exclusive. That is, there may be some overlap among criteria.)

Detection module 310 controls responses to certain messages by configuring the certain messages so responses to them are directed to response module 330. That is, when detection module 310 detects that message 350 is a vital message, detection module 310 configures the message and/or response module 330 so that any response to the message is directed to response module 330. When response module 330 receives a response for such message 350, response module 330 determines who wrote the response. When the response is from one of the selected representatives 301, 302, or 303 (referred to herein as "authorized" responses), response module 330 takes actions for the response to enable contributions to an authorized response as indicated herein below.

When the response is NOT from one of the selected representatives, such as illustrated response 351, response module 330 blocks the response at 373, according to at least one embodiment of the present invention. In other embodiments, response module 330 does allow unauthorized responses such as response 351, i.e., responses that are not from one of the selected representatives, but response module 330 delays the delivery of such unauthorized responses (instead of blocking 373) until any authorized responses from representatives 301, 302, and 303 are delivered and causes the unauthorized responses, like response 351, for example, to be presented with an "unauthorized" or "unofficial" marking or the like. (Herein "delivery" includes delivery of a private message to an individual or publication, more generally, such as posting.) As an alternative to one aspect of the forgoing, response module 330 delays the delivery of unauthorized responses until a predetermined time interval has passed, i.e., a time interval after the original vital message was generated. In embodiments, response module 330 presents responses as a thread, wherein a single, authorized response is presented first with unauthorized responses presented subsequently in the thread, where it may present the thread with the non-authorized responses collapsed, so that the recipient must take specific action to un-collapse the thread in order to view the unauthorized responses. In one or more embodiments, response module 330 causes the authorized responses to be presented with an "authorized" or "official" marking or the like.

Response module 330 mediates interaction by the selected representatives about an authorized response upon receiving identification of the selected representatives from selection module 320. This enables sending a unified response 360 to vital message 350, which may be a single response 360, for example. This is illustrated as published response 360. However, the response may, alternatively, be a private response 361 back to the original sender 350.

In one aspect, selection module 320 notifies 332, 333, and 334 each of representatives 301, 302, and 303 who selection module 320 selected to contribute to an authorized response. (This includes, in one aspect of at least one embodiment of the present invention, notifying each selected representative of the identity of each of the other selected representatives.) Consequently, each notified representative provides a response, or at least some of them do, as illustrated in FIG. 3 and described below.

When selection module 320 notifies 332, 333, and 334 representatives 301, 302, and 303 to contribute to an authorized response to vital message 350, according to at least one embodiment of the present invention, a first representative 301 to respond initiates action to create an initial response 311, which response module 330 detects, since detection module 310 configured the message so that any response to the message is directed to response module 330. In response to the action of first representative 301, response module 330 presents first representative 301, the original message 350 in a text dialog box configured to allow first representative 301 to edit in real time.

Response module 330, accordingly, receives initial response 311, written by first representative 301, which would ordinarily have gone directly to the person who generated the message to whom the representative is responding. However, according to an embodiment of the present invention, response module 330 detects and intercepts initial response 311 in order to provide a unified response 360 and configures 311 as the initial response in a shared message that the other selected representatives 302 and 303 are notified 371 and 372 about and are authorized to view and edit, i.e., add to or change. Further, response module 330 configures initial response 311 written by first representative 301 as conditional text, i.e., subject to approval of the other representatives, and includes identification of first representative 301 in association with the response of representative 301.

When a second one, 302, of the selected representatives initiates their respective initial response 312, response module 330 detects the action by the representative for responding and presents the shared message to the second representative 302—which at this point has only the response 311 written by first representative 301, including the associated identity of first representative 301—and receives second representative 302's edits and configures second representative 302's edits as conditional text with identification of second representative 302 associated therewith.

In FIG. 3, it happens that representative 303 does not respond to notification 334. However, if representative 303 does initiate their respective initial response, response module 330 presents the shared message to third representative 303—which now has the responses written by the first and second representatives 301 and 302, each including the associated identities of the respective representatives—receives the third representative 303's edits and configures the third representative 303's edits as conditional text with identification of the third representative 303 associated therewith.

In other words, for each subsequent representative, response module 330 proceeds to add subsequent responses to the shared message in similar fashion as described herein above. It should be appreciated from the foregoing that when and if the selected representatives 301, 302, and 303 respond, they are presented with a text dialog containing the original message and a block that contains the evolving response, which can be edited in real time according to respective text/commands 376, 377, and 378 by the selected representatives.

According to at least one embodiment of the present invention, when selection module 320 notifies representatives 301, 302, and 303 to contribute to an authorized response to vital message 350, respective representatives may first respond to vital message 350 individually, without seeing responses of the other ones of the representatives 301, 302, and 303. Each such response would ordinarily have gone directly to the person who generated the message, originator 340, to whom each selected representative is responding. However, according to an embodiment of the present invention response module 330 detects and intercepts each such response and delays or preempts its delivery. Consequently, each such individual response is deemed merely an initial response, according to an embodiment of the present invention.

Regardless of whether a single, shared-message response 360 is generated or individual responses are generated, response module 330 delays or preempts delivery of the response(s) of the selected representatives so that a unified response 360 may be provided that includes only selected ones of the responses or selected aspects of the single, shared-message response 360, as described herein below. (It should be understood, however, that it is possible all may ultimately be selected, depending on voting or editing or the like, as described herein below.) Response module 330 may also merge selected, individual responses of the selected representatives into a single response 360 or may present them as a thread of responses, as also described herein below.

According to an embodiment of the present invention, in response to the selected representatives 301, 302, and 303 having generated a predetermined minimum number of initial responses, response module 330 notifies each selected representative that a sufficient number of initial responses have been generated and presents to each selected representative the initial response of each other selected representative, so that the selected representatives may interact with response module 330 to direct 376, 377, and 378 the module how to unify the initial responses. That is, in response to a selected representative selecting a GUI object or menu item for viewing the initial responses, response module 330 presents to the representative the full texts of all the initial responses together concurrently in a single area of the representative's social network user interface without presentation of the text of any other messages except the message to which the initial responses are directed. The initial, individual responses may be presented as a thread of individual responses, for example. This may be in an area of the user interface where messages are ordinarily presented, or it may be a different area in different embodiments. Alternatively, instead of using a predetermined minimum number of initial responses, module 330 may predict the number of responses it expects based on historical data and notify selected representatives once it receives responses in excess of the predicted number.

In connection with presenting the full texts of all the initial responses together in the single area, response module 330 is configured to collect respective voting input 376, 377, and 378 from the representative who is viewing all the initial responses. Each representative has GUI objects configured to receive voting input from the representative for each initial response. That is, the ordinary social network user interface is customized for each selected representative, according to an embodiment of the present invention, to include GUI objects configured to receive respective votes 376, 377, and 378 for the respective initial responses and a GUI object configured to receive an indication that the representative has cast all votes, which is also sent as a respective instruction 376, 377, or 378.

Each selected representative votes on initial responses by ranking them, according to an embodiment of the present invention. Instead, each selected representative votes on initial responses by voting or not voting for them, according to an embodiment of the present invention. Response module 330 discards an initial response if its sum of votes or rankings of the representatives is below a predetermined threshold, according to an embodiment. Responses of the selected representatives having a number of votes or a sum of rankings above a predetermined threshold are merged by response module 330 into a single message 360 and presented marked as "authorized," according to an embodiment of the present invention. Alternatively, where representative's responses are delivered as a reply thread to the original person who initiated the message, those responses are delivered by response module 330 as a thread, wherein the response having the most votes, or the highest ranking is presented first in the thread and responses with less votes or lower sum of rankings are presented proportionally lower in the thread. In an embodiment, responses of selected representative having a sum of votes or rankings above a predetermined threshold are presented marked as "authorized" or the like and others are not marked or may be marked "non-authorized" or the like.

Response module 330 is configured to determine from an organization's database whether hierarchical relationships exist in the organization among the representatives who were selected to respond to message 350 deemed vital, i.e., superior and subordinate. Where there is hierarchical relationship, response module 330 is configured to receive a veto indication by a superior representative with respect to votes of any selected representatives who are subordinates of the superior and to responsively discard any such vetoed vote.

In an example scenario, Alice, Bob, Charlie and Eve are members of an online social network. Alice, Bob, and Charlie are representatives of Palost pet products. Eve is an avid customer of Palost brand pet products. Eve posts message, "It's been in the news recently that Palost dog food is fatal. Is there any truth to this?" Subsequently, John posts a response to Eve, saying "I also heard that Palost dog food is bad."

Detection module 310 detects Eve's message, determines it indicates a need for a response and that the issue relates to Palost dog food. Detection module 310 notifies selection module 320.

Selection module 320 identifies Alice and Bob as Palost's Social Media representatives, notifies Alice and Bob to contribute to an authorized response to the message, and notifies response module 330 about the message and the selected representatives, Alice and Bob.

Response module 330 detects John's response to Eve's message and blocks John's response.

Alice drafts a response, received by response module 330, "We have received reports of pets becoming ill after eating Palost brand dog food. Independent testing has been done and no harmful compounds were identified."

Bob initiates a response, in response to which response module 330 presents Alice's message at. Bob signals to add Charlie, the head of marketing, to the set of representatives who contribute to the authorized response, so response module 330 notifies Charlie and records the additional, selected representative. Bob also signals that he approves whatever response Charlie approves.

Charlie initiates a response, in response to which response module 330 presents Alice's message. Charlie modifies the initial response by Alice to include, "We stand firmly behind the high quality of our products and reassure consumers that they can continue to feed Palost products with total confidence." Charlie approves the updated response and saves it.

Response module 330 detects that Alice is a subordinate of Charlie. Since Charlie updated an initial response prepared by Alice and approved the updated response, and since Alice is a subordinate of Charlie, response module 330 determines on this basis that Charlie's modification is approved for publication. Response module 330 notifies Alice and Bob that Charlie updated Alice's initial response and approved the updated response and notifies Alice, Bob, and Charlie that the response approved by Charlie is being published.

Response module 330, accordingly, publishes the response to Eve's message that includes Charlie's update to Alice's initial response, "We have received reports of pets becoming ill after eating Palost brand dog food. Independent testing has been done and no harmful compounds were identified. We stand firmly behind the high quality of our products and reassure consumers that they can continue to feed Palost products with total confidence," as combined response 360.

Thomas, Ryan, Simon, and Dave are members of an online social network. Thomas, Ryan, and Simon are Administrators for the Pure Social user group. Dave posts a message to the Pure Social group, "Pure Social widgets have stopped working since my account was migrated to the cloud. What's going on?"

Detection module 310 detects the message, determines it indicates a need for a response that relates to Pure Social widgets and notifies selection module 320.

Selection module 320 identifies Ryan, Simon, and Thomas as representatives of the Pure Social group, notifies them and notifies response module 330 about the representatives and the original message.

Ryan 301 drafts a response, received by response module 330, as follows:

"Pure Social widgets are not currently available in the Cloud. Also, due to security changes to accounts migrated to the cloud Pure Social will no longer work with your on-premise application."

Ryan 301 indicates, in connection with submitting his initial response that he approves whatever changes Thomas and Simon choose to make. Thomas and Simon receive notification of Ryan's response and his pre-approval of any changes by Thomas and Simon. Thomas updates Ryan's initial response to read as follows:

"Pure Social widgets are not currently available in the cloud and, due to security changes to cloud accounts, Pure Social will no longer work with your on-premise applications.

More information on this limitation can be found at random.link.com"

Thomas votes to submit the response based on his update. Response module 330 receives the update and notifies the three selected representatives, Thomas, Ryan, and Simon, of the vote by Thomas. Simon signals his approval to response module 330.

Response module 330 receives the approval from Simon. Based on this and the pre-approval by Ryan, response module 330 publishes combined response 360 to Dave's message, "Pure Social widgets are not currently available in the Cloud and due to security changes to cloud accounts Pure Social will no longer work with your On-Premise applications. More information on this limitation can be found at random.link.com."

Response module 330 is configured to allow each selected representative 301, 302, and 303 to opt out of providing a response, either initially or after providing an initial response or one or more subsequent response. After a selected representative opts out, response module 330 does not seek a further vote or other approval from that selected representative.

According to an embodiment of the present, a selected representative may approve a response when they are satisfied with the response, in response to which response module 330 will set an "approved" flag for the representative. Responsive to all selected representatives approving a response, response module 330 publishes or otherwise sends the response. Response module 330 may be configured to reset an "approved" flag for a response and notify the flag's associated representative when another representative edits the response after response module 330 generated the flag. The notification may be either immediate or after a predetermined time, for example, where a purpose of waiting for the predetermined time is to give other representatives time to also make edits. However, response module 330 may be configured to not reset an "approved" flag when the flag's associated representative indicated in the approval that the representative has opted out or has agreed to automatically, i.e., without further review, accept edits by others of the selected representatives.

Figure 4:
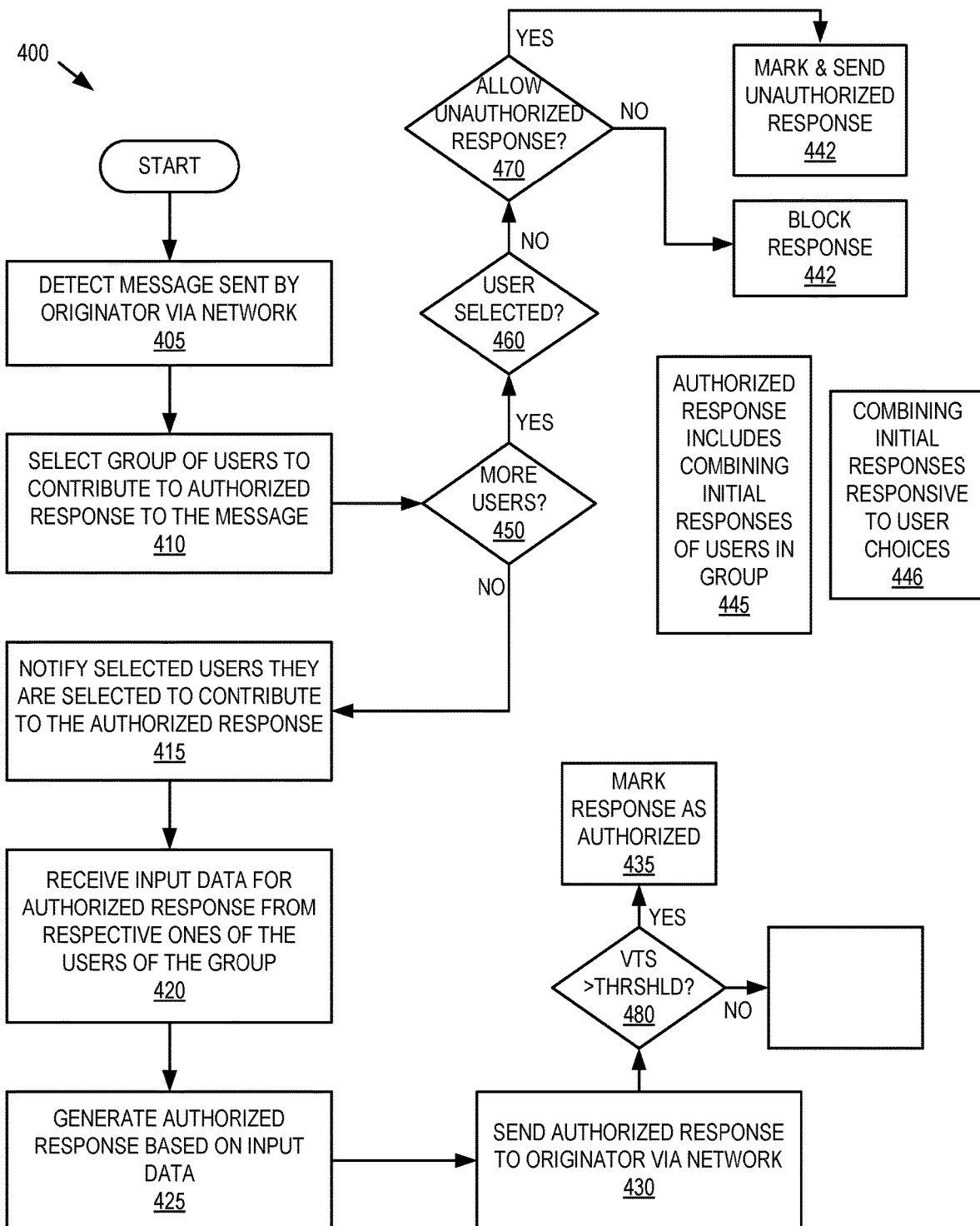
FIG. 4 illustrates in a flow chart, computer system based actions in the computing environment of FIGS. 1 through 3, according to embodiments of the present invention.

Referring now to FIG. 4, certain details are illustrated for a computer system implemented method for generating an authorized response to a message in a network, according to embodiments of the present invention. It should be appreciated that the flow chart of FIG. 4 is not strictly limiting. Actions may occur in a different logical sequence or in parallel in different embodiments. For example, although the flow chart shows that in the illustrated process 400 user input is not received 420 until there are no more users who are selected 450 to be representatives for responding to a message, it should be appreciated that user input, may be received 420 and processed before or concurrently with selections 450 of additional users as representatives. Also, selections 450 of "additional" users may include substitutions of one user for another and opting out, as has been described elsewhere herein.

At 405, computer system process 400 detects a message sent by an originator via a network. At 410, process 400 selects a group of users to act as a representative for contributing to an authorized response to the message, based on the computer system process analyzing the message. At 415, the selected representatives are notified by process 400 that they have been selected to contribute to the authorized response. At 450, if process 400 receives selection of other users from users who are selected by process 400 to contribute to the authorized response, process 400 returns to 415 to do more notification. If no, process 400 proceeds to receiving 420 input data for the authorized response from respective ones of the representatives, which may include, for example receiving an initial response, receiving an edit for the final response, or receiving voting instructions from a selected representative.

In another branch of process 400, responses to the message detected at 405 may be received 460 that are responses from other, non-selected users. Consequently, process 400 is configured to determine 470 whether each response it receives for the message is authorized, i.e., from a selected representative, or not.

For input data, i.e., responses/instructions (edits and voting), from selected representatives, process 400 generates 425 an authorized response based on the input data, which may include marking, by process 400, the authorized response sent by process 400 to the originator via the network. For example, the marking of the response may indicate that the response is authorized. Then process 400 sends 430 the authorized response to the originator via the network.

For responses not from a selected representative, process 400 determines 480 whether it has been set to block responses from users who are not selected representatives. If set to block, process 400 blocks 442 the response to the message received 460 from a user who is not one of the users who were selected by process 400 and who is not selected by one of the users who were selected by process 400. If not set to block, process 400 sends 443, as an unauthorized response, the response to the received 460 message, which may include process 400 adding a marking to the response that indicates the response, is unauthorized.

The input data received 420 by process 400 for the authorized response includes respective initial responses for the respective ones of the users of the group. The generating 425 of the authorized response by process 400 based on the input data may include combining the respective initial responses. In another aspect, the combining of the respective initial responses may include combining the respective initial responses responsive to the choices.

The structures and processes disclosed herein may be used with collaboration systems, project management and social systems, including, for example, social networking, asynchronous networks (e.g., "I Follow" types of networks, like Twitter, etc.), synchronous networks (e.g., "I Connect" types of networks, like IBM Connections, etc.), email (e.g., IBM Notes/Domino, Microsoft Exchange, Google Mail, etc.), real time instant messaging (e.g., Persistent Chat, IBM SameTime, etc.), other instant messaging (e.g., IBM SameTime, etc.), wiki networks (e.g., IBM Connections Wiki, Confluence Wiki, etc.) and other product/task systems (e.g., Rational Team Concert, Microsoft Project, etc.). The structures and processes disclosed herein may be used with instant messaging (IM), short message services (SMS), blogs, web sites, communities (such as, for example, LinkedIn and Facebook), news feeds, emails, VoIP, software phones (such as, for example, Skype and Google Voice), etc.

While this specification contains many specifics, these should not be construed as limitations on the scope of the invention or of what can be claimed, but rather as descriptions of features specific to particular implementations of the invention. Certain features that are described in this specification in the context of separate implementations can also be implemented in combination in a single implementation. Conversely, various features that are described in the context of a single implementation can also be implemented in multiple implementations separately or in any suitable sub combination. Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

Those skilled in the art having read this disclosure will recognize that changes and modifications may be made to the embodiments without departing from the scope of the present invention.

It should be appreciated that the particular implementations shown and described herein are illustrative of the invention and its best mode and are not intended to otherwise limit the scope of the present invention in any way. Other variations are within the scope of the following claims.

The actions recited in the claims can be performed in a different order and still achieve desirable results. Likewise, the processes depicted in the accompanying figures do not necessarily require the particular order shown, or sequential order, to achieve desirable results. In certain implementations, multitasking and parallel processing can be advantageous.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims.

As used herein, the terms "comprises," "comprising," or any other variation thereof, are intended to cover a non-exclusive inclusion, such that a process, method, article, or apparatus that "comprises" a list of elements may have other elements not expressly listed or inherent to such process, method, article, or apparatus. Further, no element described herein is required for the practice of the invention unless expressly described as essential or critical.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed.

The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A system for user-processing of data, the system comprising:

a processor; and a computer readable storage medium connected to the processor, where the computer readable storage medium has recorded thereon a program for controlling the processor, and where the processor is operative with the program to execute the program for:

detecting, by the computer system, a social network message sent from an originating person via a network, where the message includes message content that relates to a group of persons;

determining, by the computer system analyzing the message content, that the message relates to the group of persons;

selecting persons who are members of the group of persons as designated senders to contribute to an authorized response to the message for the group of persons, including the computer system selecting the designated senders based on the computer system analyzing the message;

notifying each person who is a designated sender selected by the computer system that the respective designated sender is selected by the computer system to send a respective response to the social networking message from the originating person, wherein the respective response will contribute to the authorized response;

intercepting, by the computer system, respective responses sent to the originating person from the persons designated as senders in response to the notification;

generating a response as an authorized response for the group of persons, by the computer system processing the respective intercepted responses, wherein the processing combines the respective intercepted responses into a single response; and sending, to the originating person, the single response generated by the computer system combining the respective intercepted responses from the persons designated as senders, wherein the sending includes sending the single response via the network by the computer system as the authorized response for the group of persons.

2. The system of claim 1, wherein processing the respective intercepted responses from the designated senders includes generating a thread of the respective responses from the designated senders.

3. The system of claim 1 comprising, wherein the processor is operative with the program to execute the program for:

receiving, by the computer system, input data from the designated senders, wherein the input data from each respective one of the designated senders identifies at least one of the respective responses that is favored by the respective one of the designated senders for combining the respective intercepted responses into the single response.

4. The system of claim 3, wherein the combining the respective responses includes combining the respective responses into a thread, wherein the thread presents more favored ones of the respective responses before less favored ones of the respective responses based on the input data received from the designated senders.

5. The system of claim 1, wherein generating the authorized response comprises marking, by the computer system, the authorized response sent to the originator via the network by the computer system, wherein the marking of the authorized response indicates that the marked response is an authorized response for the group.

6. The system of claim 1, wherein the processor is operative with the program to execute the program for:
blocking, by the computer system, a response to the message from a user who is not one of the designated senders.

7. The system of claim 1, wherein the processor is operative with the program to execute the program for:
sending, as an unauthorized response by the computer system, a response to the message from a user who is not one of the designated senders, wherein the computer system adds a marking to the unauthorized response that indicates the marked response is unauthorized.

8. A computer program product for user-processing of data in a computer network, including a computer readable storage medium having instructions stored thereon for execution by a computer system, wherein the instructions, when executed by the computer system, cause the computer system to implement a method comprising:
detecting, by the computer system, a social network message sent from an originating person via a network, where the message includes message content that relates to a group of persons;
determining, by the computer system analyzing the message content, that the message relates to the group of persons;
selecting persons who are members of the group of persons as designated senders to contribute to an authorized response to the message for the group of persons, including the computer system selecting the designated senders based on the computer system analyzing the message;
notifying each person who is a designated sender selected by the computer system that the respective designated sender is selected by the computer system to send a respective response to the social networking message from the originating person, wherein the respective response will contribute to the authorized response;
intercepting, by the computer system, respective responses sent to the originating person from the persons designated as senders in response to the notification;
generating a response as an authorized response for the group of persons, by the computer system processing the respective intercepted responses, wherein the processing combines the respective intercepted responses into a single response; and
sending, to the originating person, the single response generated by the computer system combining the respective intercepted responses from the persons designated as senders, wherein the sending includes sending the single response via the network by the computer system as the authorized response for the group of persons.

9. The computer program product of claim 8, wherein processing the respective intercepted responses from the designated senders includes generating a thread of the respective responses from the designated senders.

10. The computer program product of claim 8, wherein the instructions, when executed by the computer system, cause the computer system to implement a method comprising:
receiving, by the computer system, input data from the designated senders, wherein the input data from each respective one of the designated senders identifies at least one of the respective responses that is favored by the respective one of the designated senders for combining the respective intercepted responses into the single response.

11. The computer program product of claim 10, wherein the combining the respective responses includes combining the respective responses into a thread, wherein the thread presents more favored ones of the respective responses before less favored ones of the respective responses based on the input data received from the designated senders.

12. The computer program product of claim 8, wherein generating the authorized response comprises marking, by the computer system, the authorized response sent to the originator via the network by the computer system, wherein the marking of the authorized response indicates that the marked response is an authorized response for the group.

13. The computer program product of claim 8, wherein the instructions, when executed by the computer system, cause the computer system to implement a method comprising:
blocking, by the computer system, a response to the message from a user who is not one of the designated senders.

14. The computer program product of claim 8, wherein the instructions, when executed by the computer system, cause the computer system to implement a method comprising:
sending, as an unauthorized response by the computer system, a response to the message from a user who is not one of the designated senders, wherein the computer system adds a marking to the unauthorized response that indicates the marked response is unauthorized.

* * * * *